United States Patent Office 3,491,334
Patented Jan. 20, 1970

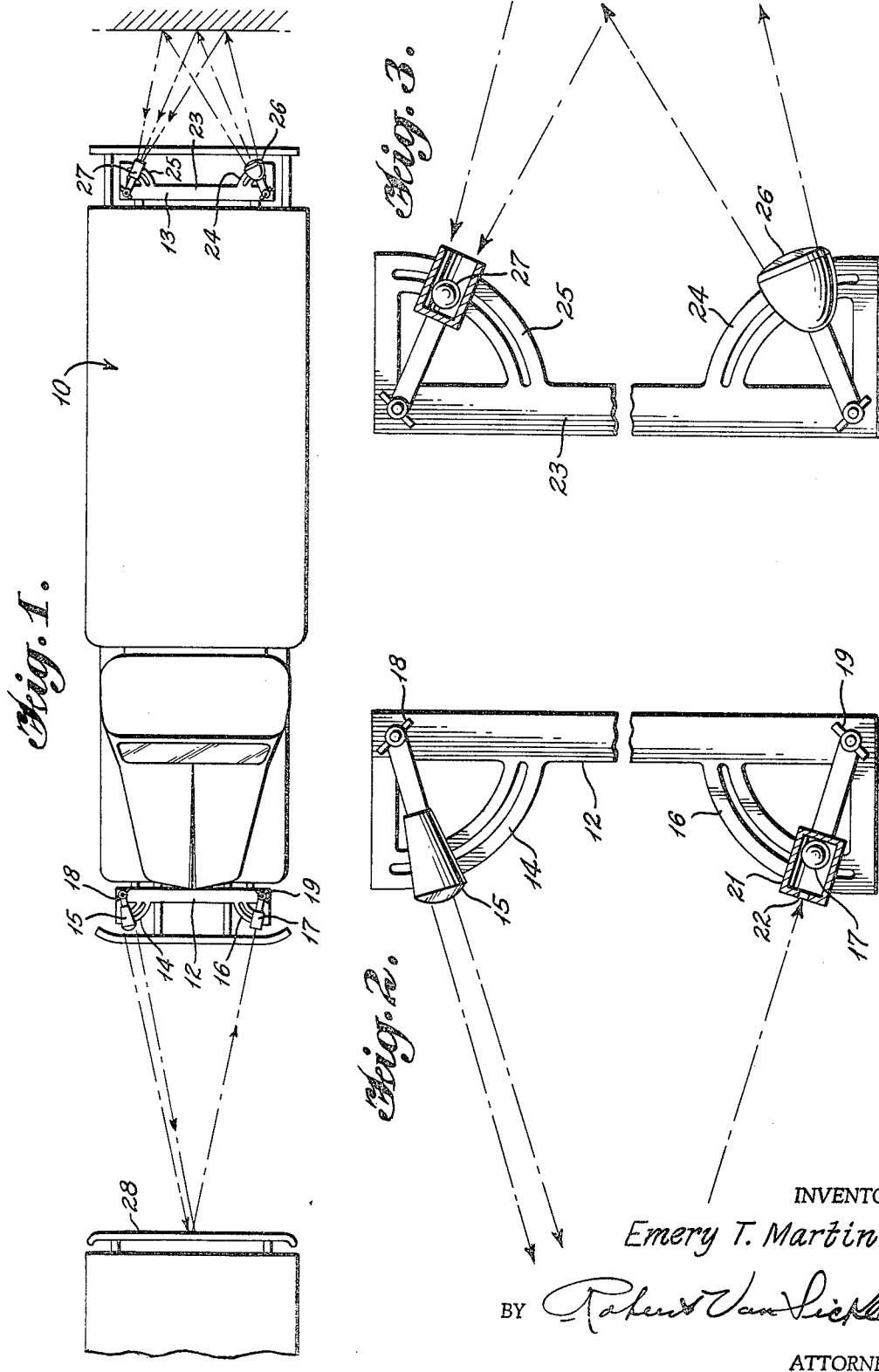

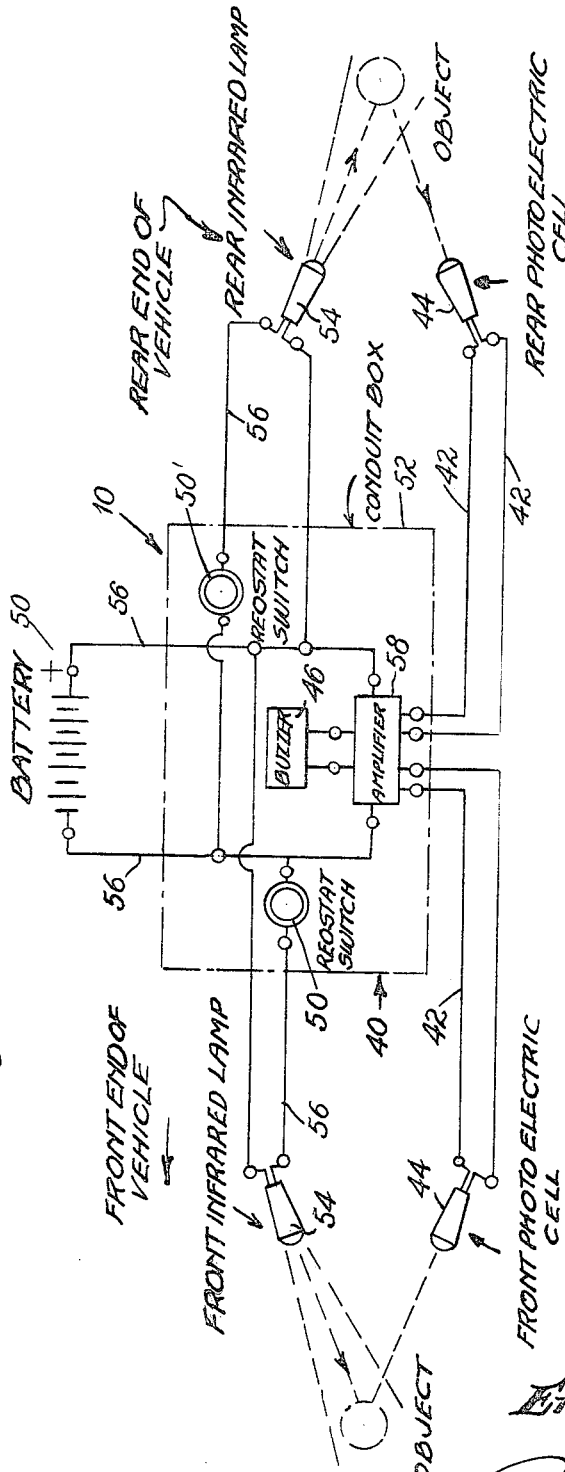
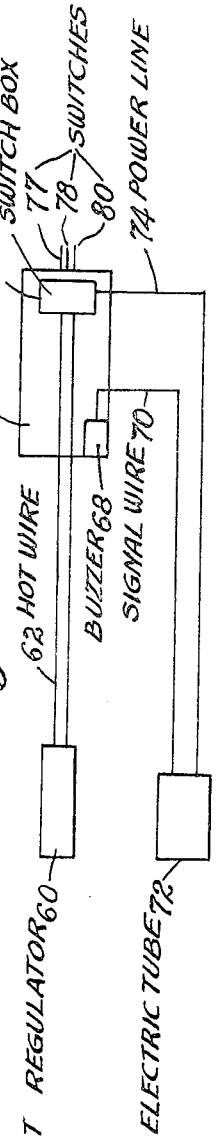

3,491,334
PHOTOSENSITIVE AUTOMOTIVE ALARM DEVICE
Emery T. Martin, 437 1st St., Apt. 3A,
Brooklyn, N.Y. 11215
Substitute for abandoned application Ser. No. 387,701, Aug. 5, 1964. This application Mar. 28, 1969, Ser. No. 824,338
Int. Cl. G08g 1/04
U.S. Cl. 340—34
2 Claims

ABSTRACT OF THE DISCLOSURE

This is a warning device for obstructions in the path of a moving vehicle. Adjustably mounted lights front and rear are carried by the vehicle projecting a beam of infra-red at an angle with respect to the path of the vehicle. An adjustably mounted photo cell senses light reflected from an obstruction and actuates a signal.

---

This invention relates to a warning device and method for drivers of motor vehicles and more particularly to that type of warning device which will indicate the presence of an obstruction to further movement of the vehicle when the vehicle is moving either backward or forward.

In the operation of motor vehicles there are conditions under which the view of the driver ahead and to the rear of the vehicle is obstructed so that he is unable to see clearly any obstructions which might be in his path. Towards the front this condition exists where there is a heavy fog or under a rainstrom or a snow storm. Towards the rear, a small child may not be visible or a bicycle parked by or a person stepping from the curb may not be immediately apparent. Warning devices which indicate any obstruction located in the path of movement of the vehicle indiscriminately would be sounding all the time, as for instance when parking, the auto behind the moving vehicle would actuate the alarm unnecessarily. However, the device which could be adjusted to sound an alarm would alert the driver to either avoid the obstruction or to stop the vehicle.

It is recognized that warning devices are not generally new and this invention is not directed to a new concept but to an improvement of the old idea of warning the driver of the existence of an obstruction in his path of movement. A warning device which will operate only at a distance, which may be selected, so that the driver has time to avoid the obstruction or stop his vehicle and which will not operate on obstructions which, while in the possible path of movement of the vehicle, are not hazards, forms the subject of this invention.

It is an object of the present invention to provide a vehicle warning device to be used on vehicles such as trailer trucks and other types so when backing up and when the view of the driver of a second vehicle is obstructed he will be warned by a buzzer or alarm which will alert him of approaching danger or possibly striking a pedestrian.

A further object of the present invention is to provide a warning device which may be carried on the front and back of a vehicle and when in operation will warn the driver of that vehicle in time to stop the vehicle or to avoid the obstruction.

Another object of this invention is to provide means which may be adjusted to any distance ahead or to the rear of the vehicle which will warn the driver that an obstruction is present at that particular distance either ahead or behind the vehicle which means will not be actuated by other obstructions which may be close to the path of the vehicle.

It is a further object of the present invention to provide means for directing a beam of infra-red light in a path which is at an angle to the path of movement of the vehicle and to direct a photo cell so that its reception path will intersect the path of infra-red light at a specific distance in front of the vehicle so that any obstruction which may be illuminated by the infra-red beam will reflect rays which will be picked up by the photo cell at a particular distance in front of the vehicle and which through an amplifying circuit will sound a warning to the driver.

A still further object of this invention is to provide means for directing a beam of infra-red light to the rear of a vehicle and at an angle to the path of travel of that vehicle and to direct a photo cell so that the reflected rays of light from any object illuminated by the infra-red rays will be picked up by the photo cell at the particular point where the path of the infra-red light rays and the direction of pickup of the photo cell cross.

It is still a further objective of this invention to provide a source of light, either white light or light of the infra-red type which may be projected forward of the vehicle and to also provide a photo cell mounted also forward of the vehicle which will be actuated by reflected rays of light from any obstruction which may be in the path of movement of the vehicle and at some predetermined distance in front of the vehicle, both the source of light and the photo cell being angularly adjustable with regard to a longitudinal axis of the vehicle so that the predetermined distance forward of the vehicle may be varied to meet driving conditions.

Another object of the present invention is to provide a light source and a photo cell mounted on the rear of the vehicle to detect obstructions which might be in the path of the vehicle when moving rearwards, the light source and the photo cell being so adjusted that the detection distance from the rear of the vehicle is shortened and spread to include all of the area equal in width of the vehicle and a short distance behind the vehicle.

A further objective is to provide a vehicle warning device that may be used on busses to alert the driver when young children are hitching a ride on the back of a bus and the device may also be used on passenger automobiles when parking or backing out of driveways where small children may not be visible to the driver.

Still another object is to minimize the possibility of a collision with parked or stalled cars along the side of the road or street when the vision of the driver of an approaching car from the rear is obscured due to fog, rain or snow.

It is a still further objective of this invention to provide means for regulating the intensity of the light source to meet varying conditions.

Additional objects of the invention are to provide a vehicle warning device bearing the objects in view which is of simple construction, has a minimum of component parts, and is inexpensive to manufacture and efficient in operation.

For other objects and for a better appreciation of the invention, reference may be had to the following detailed description taken in conjunction with the accompanying drawings in which:

FIGURE 1 is a top plan diagrammatic view of the apparatus mounted on a truck;

FIGURE 2 is a detailed view of the mounting for the light source and the photo cell, at the front of the vehicle;

FIGURE 3 shows the mounting at the rear of the vehicle;

FIGURE 4 is a wiring diagram of the apparatus; while

FIGURE 5 is a modification showing a diagrammatic view of a similar warning device for vehicles.

Referring more particularly to FIGURES 1 to 3, a vehicle 10 is diagrammatically shown having a front supporting bar 12 and a rear supporting bar 13. These bars are mounted conveniently so as to provide adequate protection for the apparatus and for proper functioning of the same. Supported on the bar 12 for partial rotation, a quadrant 14 carries a source 15 of infrared light which may be adjusted by rotation of the quadrant to project a beam forward of the vehicle and at any angle to the longitudinal axis of the vehicle.

In like manner a similar quadrant 16 is mounted at the other end of the bar and supports a photo cell 17. Thumb screws 18 and 19 respectively hold the quadrants 15 and 16 in an adjusted position. The photo cell 17 is enclosed in a housing 21 which has a restricted opening 22 so that only light beams from a particular source may actuate the photo cell 17.

At the rear of the vehicle a bar 23 supports quadrants 24 and 25 on the opposite ends and mounted on the respective quadrants are a source of light 26 and a photo cell 27. These instruments differ slightly from those on the front by providing a spreading beam of light and a less restricted housing for the photo cell 27 so that the beam at the rear of the vehicle may be adjusted to cover a greater width and at a shorter range. The photo cell 27 at the rear will likewise be actuated by reflected light beams from a greater area.

Referring to FIGURE 4, which is a wiring diagram of the apparatus, a vehicle warning device 40 made in accordance with the present invention is shown to include a pair of photo cells 44, one in the front end of the vehicle and the other at the rear end of the vehicle. A signal wire 42 is secured to the photo cell 44 at both front and rear ends and secured to an amplifier 58 in the conduit box 52 which rings the buzzer 46. A power wire 56 is secured to the infra-red lamp 54 and secured at its other end to a rheostat switch 50' which is received within the conduit box 52 and is connected to the vehicle battery 50.

In the modification shown in FIGURE 5, a voltage regulator has been shown at 60 with the hot wire 62 connected to rheostat switch 64 in the switch box 66. A buzzer 68 has been shown in this switch box 66 and the signal wire 70 has been indicated showing the connection to the photoelectric tube 72.

A power wire 74 has been shown leading from the rheostat switch 64 to the photo electric tube 72. Three switches 77, 78 and 80 have been shown. The switch 76 indicates the cut-off position while switch 78 shows the low position which gives a low flow of electronic eye, useful for city driving.

The switch 80 reflects the third position whereby the current or voltage may be increased, giving a longer range which is applicable in more extended road driving. Further, during inclement weather, the switch 80 is used for supplying additional voltage for driving in fog, rain or where visibility is normally poor, thereby alerting the driver, particularly with regards to obstacles, etc. in his path.

In use the apparatus will enable the driver to operate his vehicle under greater safety conditions by providing a warning signal which will operate regardless of fog or otherwise poor visibility towards the front and will provide a safety warning signal for any obstruction when backing.

The source of light and the photo cell are adjusted to the proper desired angle so that any obstruction at some distance forward of the vehicle, say 100 yards will be illuminated by the beam of light, and the reflections from that illumination will be picked up by the restricted area of the photo cell and produce a current which after amplification will sound a warning signal.

Towards the rear the light beam may be adjusted to cover a wider area and the photo cell so positioned that it will pick up reflections over the wider area and at a close distance behind the vehicle. This will provide ample time to stop the vehicle and will prevent the alarm from being actuated by other obstructions which while in the path of possible movement of the vehicle are not sufficiently close to be struck by the vehicle.

Applicant, in this invention has provided a safety device which will allow a driver to proceed with a greater feeling of security and minimize possible prevention of accidents and property damage.

What is claimed as new is:

1. A warning device for vehicles comprising a forward support attached to the vehicle, a rear support attached to the vehicle, a pair of quadrants mounted on each of the supports, a light source and a photo cell mounted on each support by said quadrants for angularly adjustable rotation towards the front and rear of said vehicle so that beams from the light source will be projected forward and rearward of the vehicle at a predetermined distance to illuminate any obstruction in the path of the vehicle and that reflected light from the obstruction will actuate the photo cell, and an audible signal actuated by said photo cell.

2. A warning device according to claim 1 having screw adjusting means to control the angle of the light beam with respect to the longitudinal axis of the vehicle and also to control the position of the restricted opening of the housing so that the path of the light beam and the path of the reflected beam actuating the photo cell meet at a predetermined point forward of the vehicle.

References Cited

UNITED STATES PATENTS 2,896,089    7/1959    Wesch _____ 340—34

THOMAS B. HABECKER, Primary Examiner

U.S. Cl. X.R.

250—217